(12) United States Patent  
Arnetoli

(10) Patent No.: US 7,984,555 B2  
(45) Date of Patent: Jul. 26, 2011

(54) MOWER HEAD WITH PROTECTION FOR A CUTTING CORD

(76) Inventor: Fabrizio Arnetoli, Florence (IT)

( * ) Notice: Subject to any disclaimer, the term of this patent is extended or adjusted under 35 U.S.C. 154(b) by 493 days.

(21) Appl. No.: 12/066,309

(22) PCT Filed: Sep. 11, 2006

(86) PCT No.: PCT/IT2006/000656  
§ 371 (c)(1), (2), (4) Date: Jun. 27, 2008

(87) PCT Pub. No.: WO2007/032043  
PCT Pub. Date: Mar. 22, 2007

(65) Prior Publication Data  
US 2008/0250653 A1 Oct. 16, 2008

(30) Foreign Application Priority Data  
Sep. 13, 2005 (FI) .............................. 2005A000192

(51) Int. Cl.  
*A01D 34/416* (2006.01)
(52) U.S. Cl. ........................................ 30/276; 30/347
(58) Field of Classification Search .................. 30/276, 30/347; 56/12.7, 294  
See application file for complete search history.

(56) References Cited

U.S. PATENT DOCUMENTS

| | | |
|---|---|---|
| 4,097,991 A | 7/1978 | Proulx |
| 4,104,797 A | 8/1978 | Ballas |
| 4,114,269 A | 9/1978 | Ballas, Sr. |
| 4,145,809 A | 3/1979 | Proulx |
| 4,161,820 A | 7/1979 | Moore |
| 4,203,212 A | 5/1980 | Proulx |
| 4,253,238 A * | 3/1981 | Sheldon ............... 30/276 |
| 4,259,782 A | 4/1981 | Proulx |
| 4,274,201 A | 6/1981 | Oberg et al. |
| 4,651,421 A | 3/1987 | Zerrer |
| 4,738,085 A | 4/1988 | Nishio et al. |
| 4,805,306 A | 2/1989 | Baba |
| 4,813,140 A | 3/1989 | Calcinai |
| 4,823,465 A | 4/1989 | Collins |
| 4,882,843 A | 11/1989 | Baba |
| 4,893,410 A | 1/1990 | Hoffmann et al. |
| 4,942,664 A | 7/1990 | Zatulovsky |
| 4,959,904 A | 10/1990 | Proulx |
| 4,989,321 A | 2/1991 | Hoffmann |
| 5,010,649 A | 4/1991 | Hoffmann |
| 5,095,688 A | 3/1992 | Fabrizio |
| 5,136,782 A | 8/1992 | Calcinai |
| 5,295,306 A | 3/1994 | Sugihara et al. |
| 5,490,641 A | 2/1996 | Worthing |
| 5,526,572 A | 6/1996 | Sugihara et al. |
| 5,657,542 A | 8/1997 | White, III et al. |
| 6,141,879 A | 11/2000 | Arnetoli |
| 6,163,964 A | 12/2000 | Calcinai |
| 6,851,191 B2 | 2/2005 | Arnetoli |

FOREIGN PATENT DOCUMENTS

EP 0 840 999 A1 5/1998  
US WO 90/11873 10/1990

* cited by examiner

*Primary Examiner* — Phong H Nguyen  
(74) *Attorney, Agent, or Firm* — McGlew and Tuttle, P.C.

(57) ABSTRACT

The mower head (1) includes a body (3) with at least one exit hole (9A) for one end of a cutting cord (F) and includes, adjacent to the exit hole of the cutting cord and on at least one side of said hole, a radial projection (11) to protect the cutting cord.

18 Claims, 14 Drawing Sheets

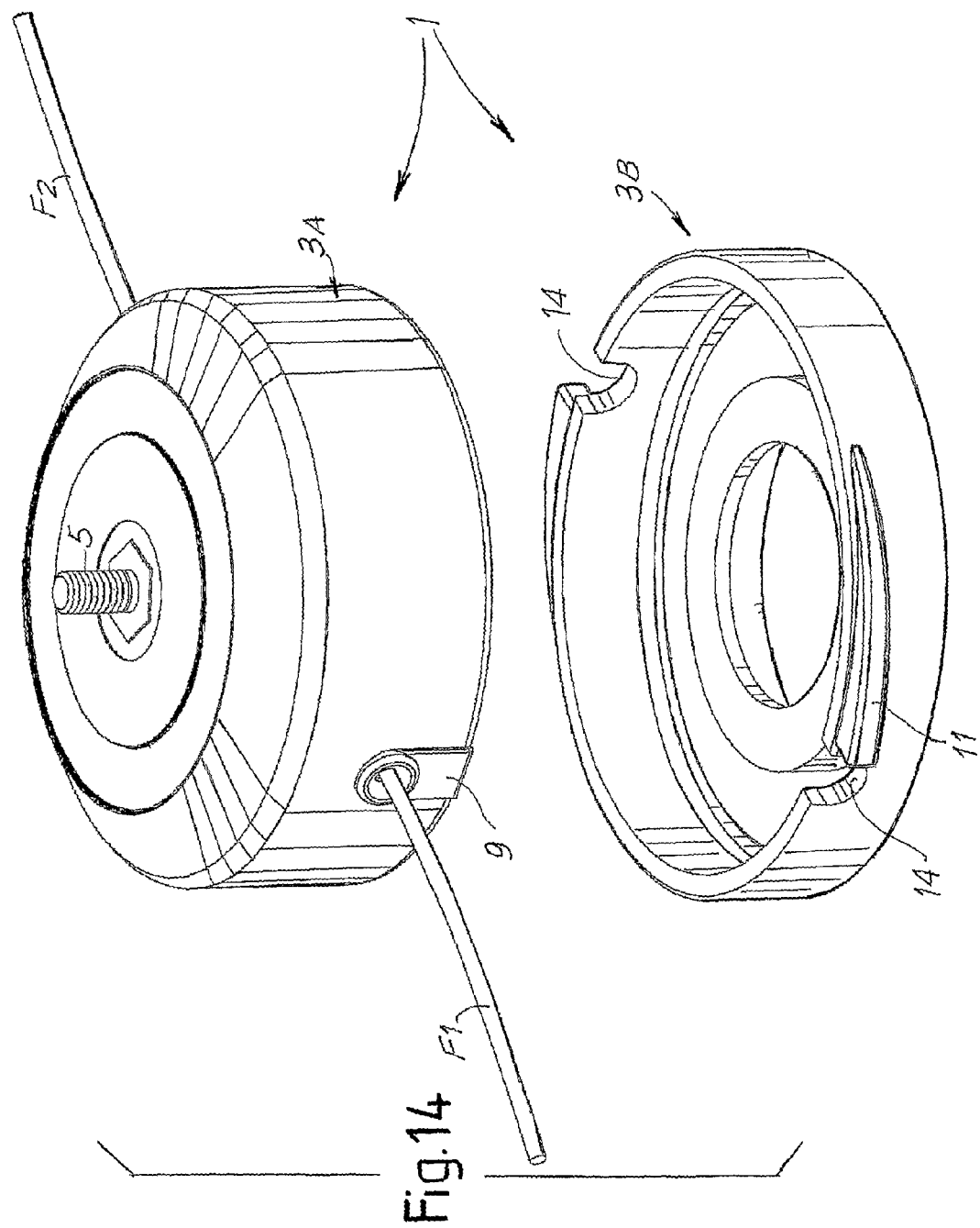

MOWER HEAD WITH PROTECTION FOR A CUTTING CORD

TECHNICAL FIELD

The invention refers to improvements to mower heads. More specifically the invention refers to improvements to mower heads with cords, i.e. mowers using a cord as a cutting element.

PRIOR ART

For gardening at hobby and professional level mower heads are commonly used for cutting grass and other vegetation, with cutting cords that project radially from a main body of the head and which, due to the centrifugal force exerted on them and to the fast rotation of the head around its axis, cut the vegetation.

Examples of cord heads of this kind are disclosed in the following U.S. patents: U.S. Pat. Nos. 4,097,991, 4,104,797, 4,145,809, 4,161,820, 4,259,782, 4,203,212, 4,274,201, 4,651,421, 4,738,085, 4,805,306, 4,813,140, 4,823,465, 4,882,843, 4,893,410, 4,942,664, 4,959,904, 4,989,321, 5,010,649, 5,526,572, 5,095,688, 5,136,782, 5,295,306, 5,490,641, 5,657,542, 6,141,879, 6,163,964, 6,851,191.

During the use of these heads it often happens that the largest vegetation or flowerbed edges, stones, clods of ground or other, cause accidental snapping of the cutting cord that projects radially from the body of the head. When this happens snapping frequently occurs in correspondence of the exit hole, i.e. the bush through which the cord exits from the body of the head. To be able to restore the required length of the cutting cord, the head must be opened and the reel on which the cord is wound shall be manually unwound, as otherwise it would be impossible to extract the free end which, after snapping, remains trapped inside the hole or the body of the head.

In some known heads (see example U.S. Pat. Nos. 4,959,904, and 6,141,879 and others mentioned above) one or two ring-shaped edges develop around the essentially circular body of the head with the double function of allowing the head cover to open and, in certain cases, protecting at least in part the cord which extends radially from an essentially cylindrical side of the body of the head between these two ring-shaped edges. In many cases these ring-shaped edges avoid snapping of the cutting cord in correspondence of the point in which it exits from the body of the head, so that any snapping caused by the obstacles against which the cord knocks occurs at a certain radial distance from the external surface of the head, avoiding that the free end of the cord remains trapped inside the head, after snapping.

However, this provision is not always effective because if the cord snaps due to an obstacle that inserts itself between the two ring-shaped edges, the cord will break again in correspondence of the point of exit from the body of the head and therefore (also due to the tendency of the cord to re-enter the head) the free end of the cord will disappear inside the internal housing of the mower head. Consequently, it will be necessary to open the body of the head and manually extract the cord to restore it.

U.S. Pat. No. 4,114,269 describes a mower head with cord, in which the exit hole of the cutting cord is surrounded by two rectilinear edges, parallel to the rotation axis of the head. The front edge, i.e. the one most forward with respect to the direction of the head rotation, has a transversal section in the shape of a drop, i.e. it has a greater thickness than that of the remaining part of the cylindrical wall of the housing body of the cutting spool, in said wall the exit holes of the cutting cord being located. This shape has the aim of reducing the stress and heating of the cord, but does not allow to overcome the problems mentioned above, connected with the re-entry of the snapped end of the cord in the spool housing.

OBJECTS AND SUMMARY OF THE INVENTION

An object of the present invention is to provide a mower head or device of the kind mentioned above, which overcomes or limits at least in part the above mentioned problems.

Essentially the invention involves a mower head with an axis of rotation and a body with at least one exit hole for an end of a cutting cord, characterized by including, adjacent to said exit hole or to each of said exit holes for the cutting cord and on at least one side of said hole a radial projection forming a protection for said cutting cord. The projections ensure that any snapping of the cord due to knocks against surrounding obstacles happens at a distance far enough from the surface on which the exit hole of the cord is made, such that the risk is avoided of the free end generated by the snapping of the cord reentering the body of the head, forcing the user to extract the cord end by stopping the cutting work and opening the head.

In a practical embodiment the radial projection is arranged at the same position as the exit hole with respect to the axial development of the cutting head.

According to a possible embodiment, the body has an essentially cylindrical surface, on which at least one of the said holes are made, and the respective projection is produced on the cylindrical surface, at a distance in a tangential direction with respect to the hole.

The radial projection can have a radial extension of at least 8 mm and preferably of at least 10 mm, for example of 15 mm or more, adjacent to said hole.

In a possible embodiment a single radial projection arranged ahead of the hole with respect to the direction of rotation of the mower head is associated to each hole.

According to preferred embodiment, the radial projection associated to the hole or to each hole has a curvilinear shape which projects gradually from the edge of the head body as far as a point of maximum projection, adjacent to said hole, increasing its radial dimension in a direction opposite to the direction of rotation of the head.

The radial projection can for example extend tangentially along the edge of the head of the body and present, along this development, a radial dimension gradually growing starting from a connection point along the body of the head until a maximum point of radial projection adjacent to the exit hole of the cutting cord. For example the radial projection can have a spiral profile.

Close to the hole the projection can have an approximately radial surface.

BRIEF DESCRIPTION OF THE DRAWINGS

The invention is better understood following the description and the drawing, which shows a practical non-restrictive embodiment of the invention. More specifically, the drawings show:

FIGS. 13 and 14 a perspective view of yet another embodiment of the invention, in closed and open condition, respectively.

DETAILED DESCRIPTION OF A PREFERRED EMBODIMENT OF THE INVENTION

Figure 1:
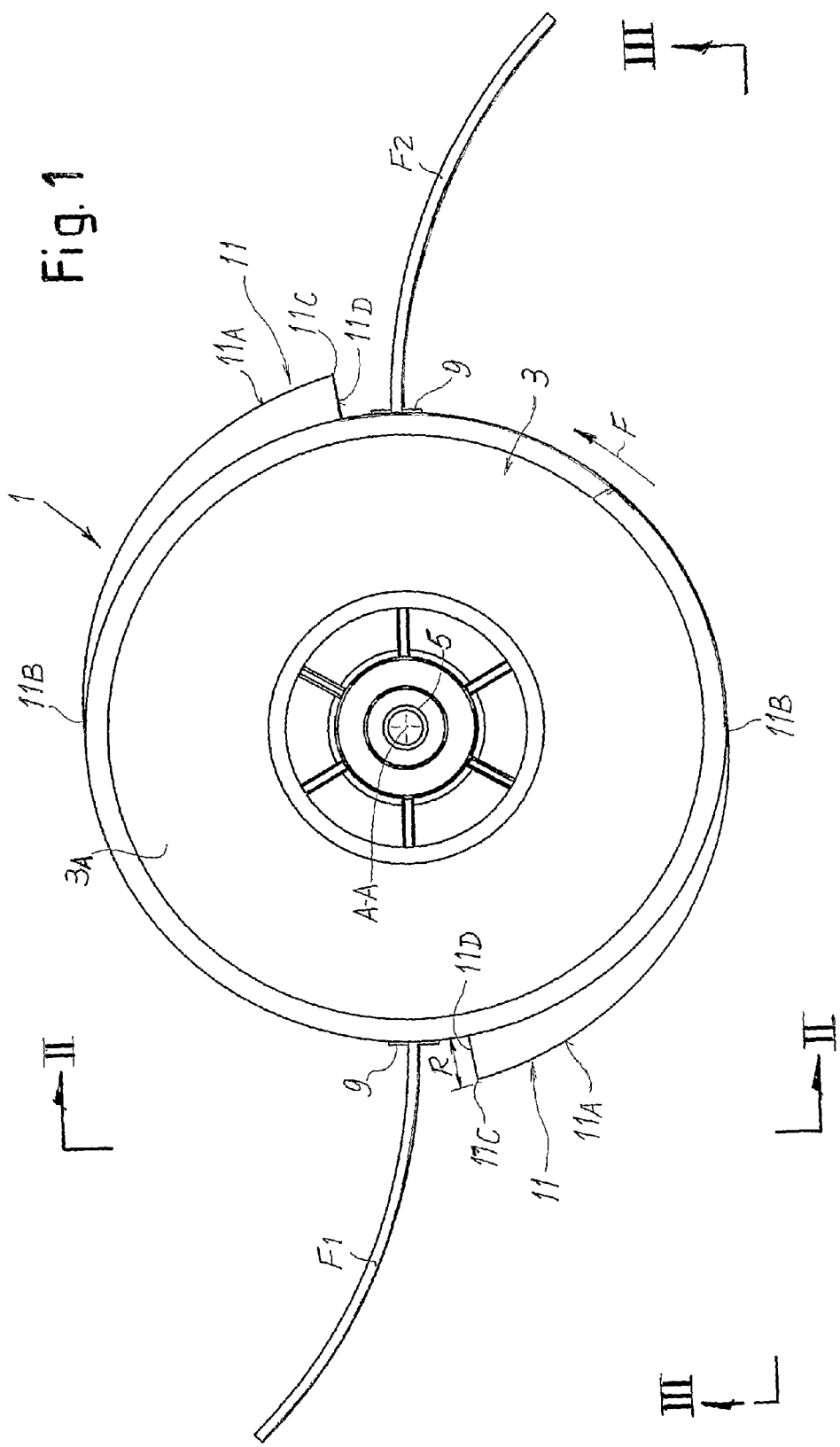
FIG. 1 a plan view of a mower head according to the invention in a first embodiment.
Figure 2:
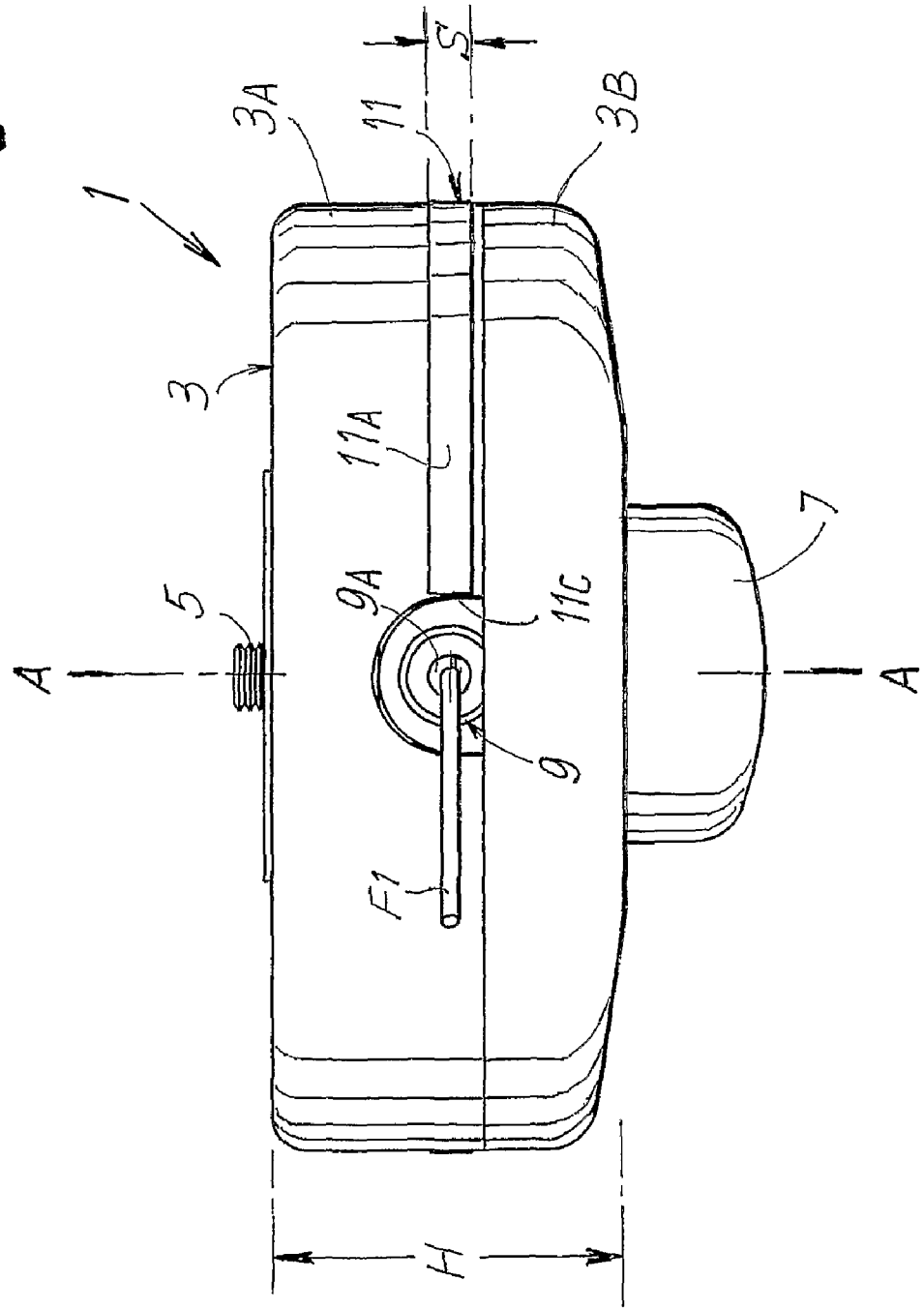
FIGS. 2 and 3 side views according to II-II and III-III of FIG. 1.
Figure 3:
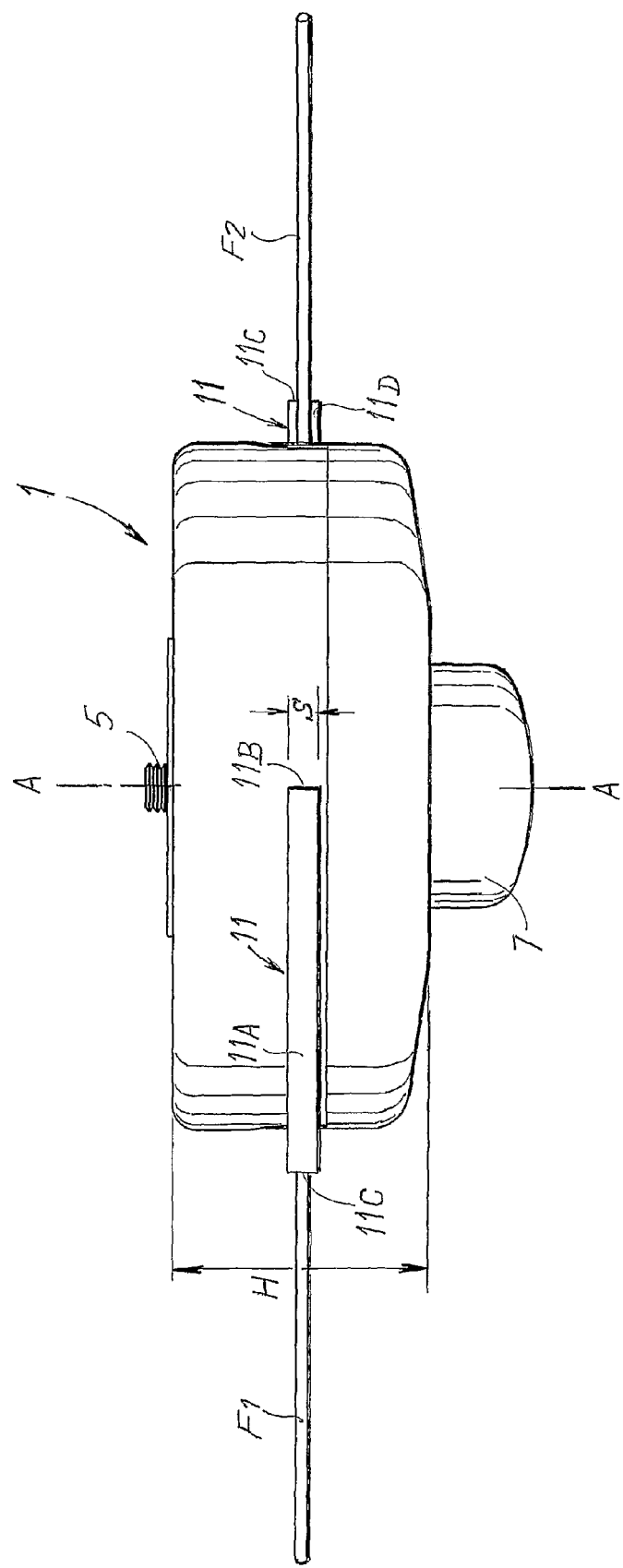

With initial reference to FIGS. 1 to 3, 1 generally designates a mower head according to the invention. Head 1 has a body 3, which can be constructed, for example but not necessarily so, in two portions 3A and 3B, coupled to each other, for example by snap catch, screws, welding or other suitable means. A-A indicates the axis of rotation of the head, which coincides with the axis of the motor shaft of the mower to which the head is mounted (not shown). In the example shown the head has a threaded rod 5 to engage into a threaded hole of the motor shaft, but it must be understood that the means of fitting the head onto the shaft can also be of another kind.

A spool or a number of spools are located within head 1, in a housing defined by body 3, between the two portions 3A and 3B which form the latter. One or more cutting cords are wound on the spool or spools, as known to those skilled in the art. In the example shown, two ends F1 and F2 of two cutting cords wound on a spool or on two spools inserted and lodged within head 1 and not shown exit from the cutting head 1. It will be understood that the number of cutting cords housed in head 1 can also be different. For example a single cutting cord is possible, which may be fitted with two ends both protruding from the mower head, or three or four or more cutting cords. In a manner known per se, head 1 is also fitted with means to lengthen the cutting cord and restore the quantity of cord which projects to the outside of the head and which is the cutting part of the mower head.

In the example shown, for this purpose head 1 has a protruding lower button 7, which during use can be pressed by pushing the head against the ground using the same grip of the mower on which the head is mounted. Repeated pressure on button 7 causes rotations of preset strokes of the spool or spools on which the cutting cord or cords are wound, to lengthen or restore the original length of the protruding ends or portions F1 and F2 of the cutting cords. The mechanism which allows this lengthening is not shown and can be any mechanism known to the experts in the art for example those indicated and disclosed in the patents mentioned in the introduction. Alternatively, automatic lengthening mechanisms can be used which restore the length of the cutting cord protruding from the head automatically using temporary variations of the speed of rotation caused by a shortening of the cord, to which a centrifugal system of lengthening control responds. In other possible embodiments the lengthening can be obtained manually by acting on the two parts or portions 3A, 3B of body 3. The methods with which the lengthening occurs are not essential for the purpose of the present invention and any known method can be used.

The ends F1 and F2 of the cutting cords exit from body 3 of the head through respective bushes 9, for example in metal and fixed on portion 3A of body 3 of mower head 1. Each bush 9 has an exit hole 9A for the cutting cord. This exit hole is located in an intermediate position along axial development H of the head.

In correspondence of the axial position in which exit holes 9A of the cutting cords are arranged, on the lateral external wall of portion 3A of body 3 according to the invention, projections 11 are provided, which have a shaped conformation. More specifically, as shown in FIG. 1, each of the two projections has a curvilinear profile 11A with a development in the form of a portion of a spiral. With this configuration projection 11 is essentially developed starting from connection point 11B almost tangent to the external cylindrical surface of body 3 to point 11C of maximum radial projection. Here projection 11 has a surface indicated by 11D, which is developed on an essentially radial plane that contains the axis of rotation A-A of the head. In the example shown projection 11 has a thickness s (FIGS. 2 and 3) greater than the diameter of the cord and advantageously about equal to or slightly greater than the diameter of exit hole 9A of the cutting cords. It is not excluded, to use projections with a thickness lower than the width of the cord or even widths greater than the diameter of the exit hole.

Furthermore, each projection 11 protrudes in a radial manner, by a length R with respect to the essentially cylindrical surface of the body 3. Dimension R can vary for example between 5 and 20 mm, preferably between 5 and 15 mm and even more preferably between 8 and 13 mm for example around 10 mm.

With a projection of this size, which essentially forms a tangential wing with variable radial dimension, an adequate protection of each of the two ends F1 and F2 of the cutting cords is obtained by projection 11, to prevent the cutting cord snapping close to exit hole 9A of respective bush 9. In fact when head 1 rotates to cut the vegetation, in the direction indicated by arrow F (FIG. 1) projection 11 which is located in front of the respective cutting cord in the direction of rotation causes a gradual distancing of any obstacle at the height of the cutting cord or cords from the cylindrical surface of body 3 of mower head 1. These obstacles, be they stones, clods of hardened ground, vegetation of specific hardness or other, will be knocked against ends F1, F2 of the cutting cords, at a distance from exit hole 9A equal to at least the radial dimension R of projection 11.

Consequently any possible snapping of cord F1 or F2 will occur at a distance R from bush 9 far enough to allow dispensing of a new portion of cutting cord from the mower head 1 without difficulty, as the cut end of the cutting cord will be protruding to the outside of the head and will not have to be recovered from the interior of the body 3 as it frequently happens instead in traditional type heads.

The spiral shape of projections 11 (profile 11A) ensures a regular operation and a limitation of mechanical knocking stress on the head. However, the possibility of shaping projections 11 differently, for example in steps, is not excluded. Arranging projections 11 on both sides of each bush 9 or exit hole 9A of the cutting cord is also possible, foe example to allow mower head 1 to rotate in both directions.

Projections 11 can be moulded, in the same material which makes up body 3 of mower head 1, and (in this specific embodiment), integral with portion 3A of body 3. The possibility is not excluded to provide these projections 11 as an insert, for example also in different material than that forming body 3 of the head.

For example head body 3 can be manufactured in moulded synthetic resin, while projections 11 can be in metal, for example in aluminium, or other material of contained cost but in any case of greater resistance than that of the base material of body 3. In this case projections 11 can be made as inserts, inserted into the mould in which the resin is then injected to shape portion 3A of body 3.

Moreover, it is also possible to manufacture projections 11 with interchangeable added elements, for example fixed to body 3 of mower head 1 with screws, pins, snap catches, daps, hooking or the like. In this case projections 11 can be replaced if broken or worn. They will also act as a mechanical protection for mower head 1, lengthening its working life.

Figure 4:
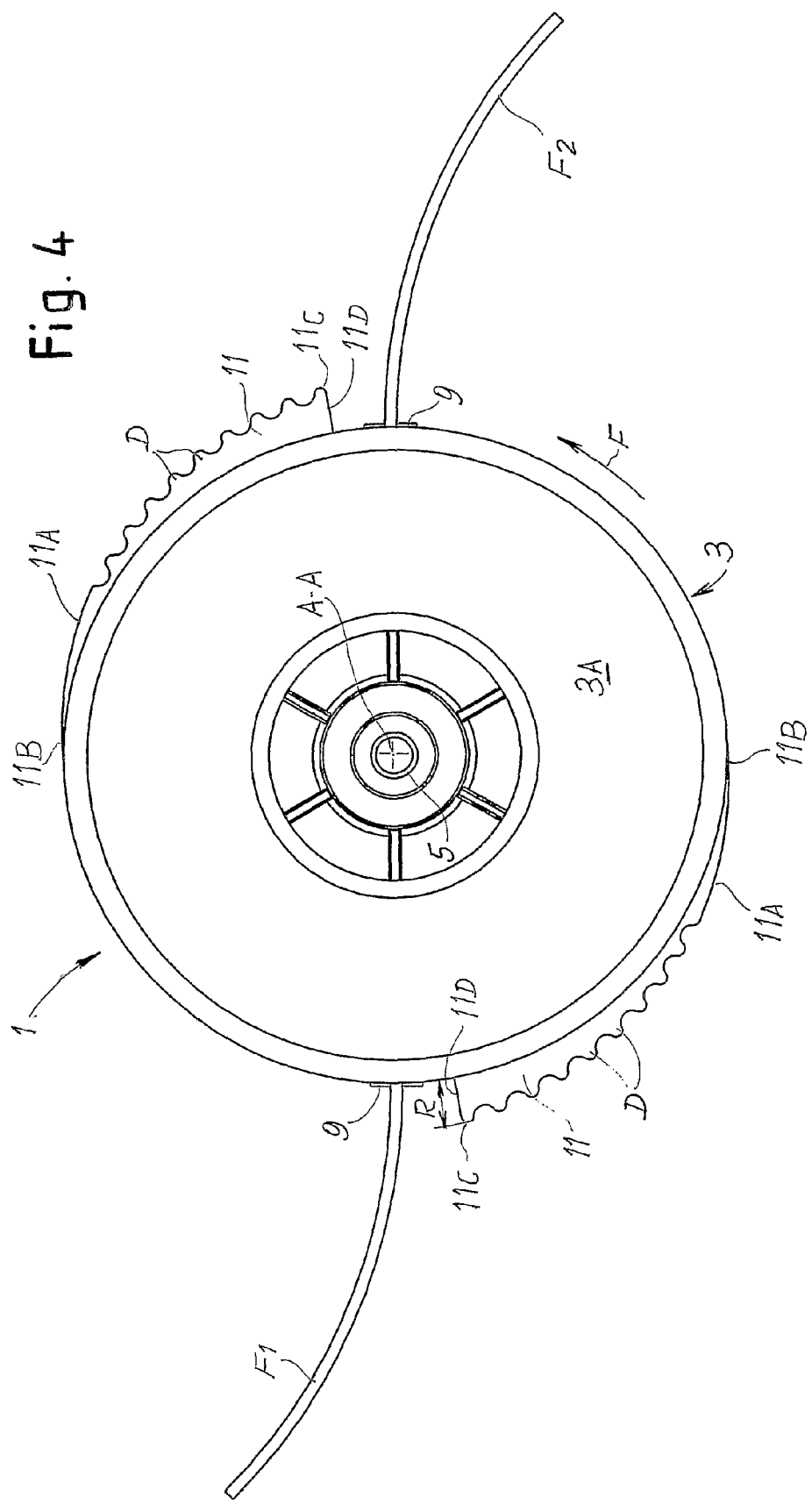
FIG. 4 a plan view similar to that of FIG. 1 of a modified and improved embodiment of the head according to the invention.
Figure 5:
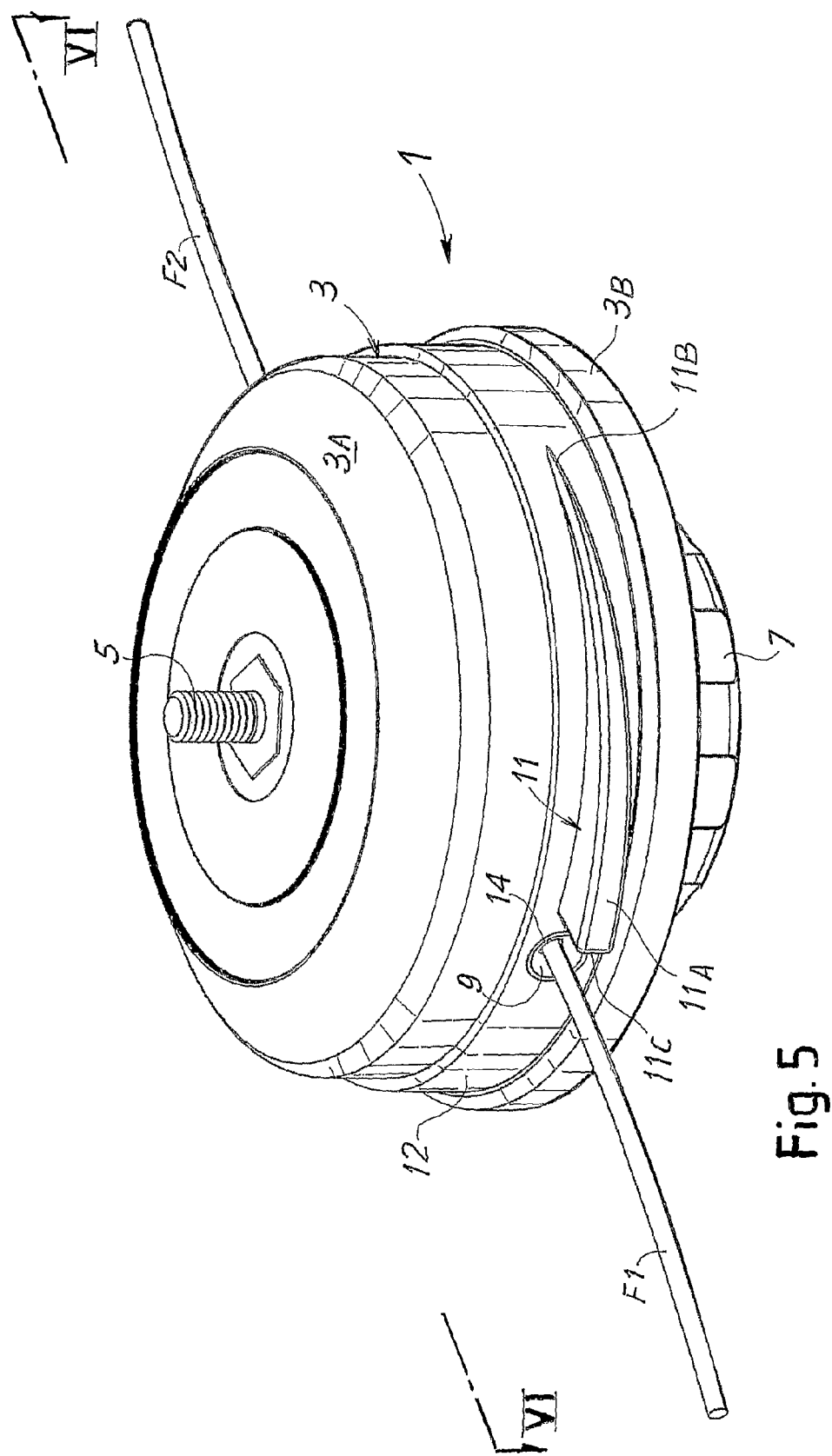
FIG. 5 a perspective view of a mower head according to the invention, in a different embodiment, with the projections made on a ring attached on the body of the head.
Figure 6:
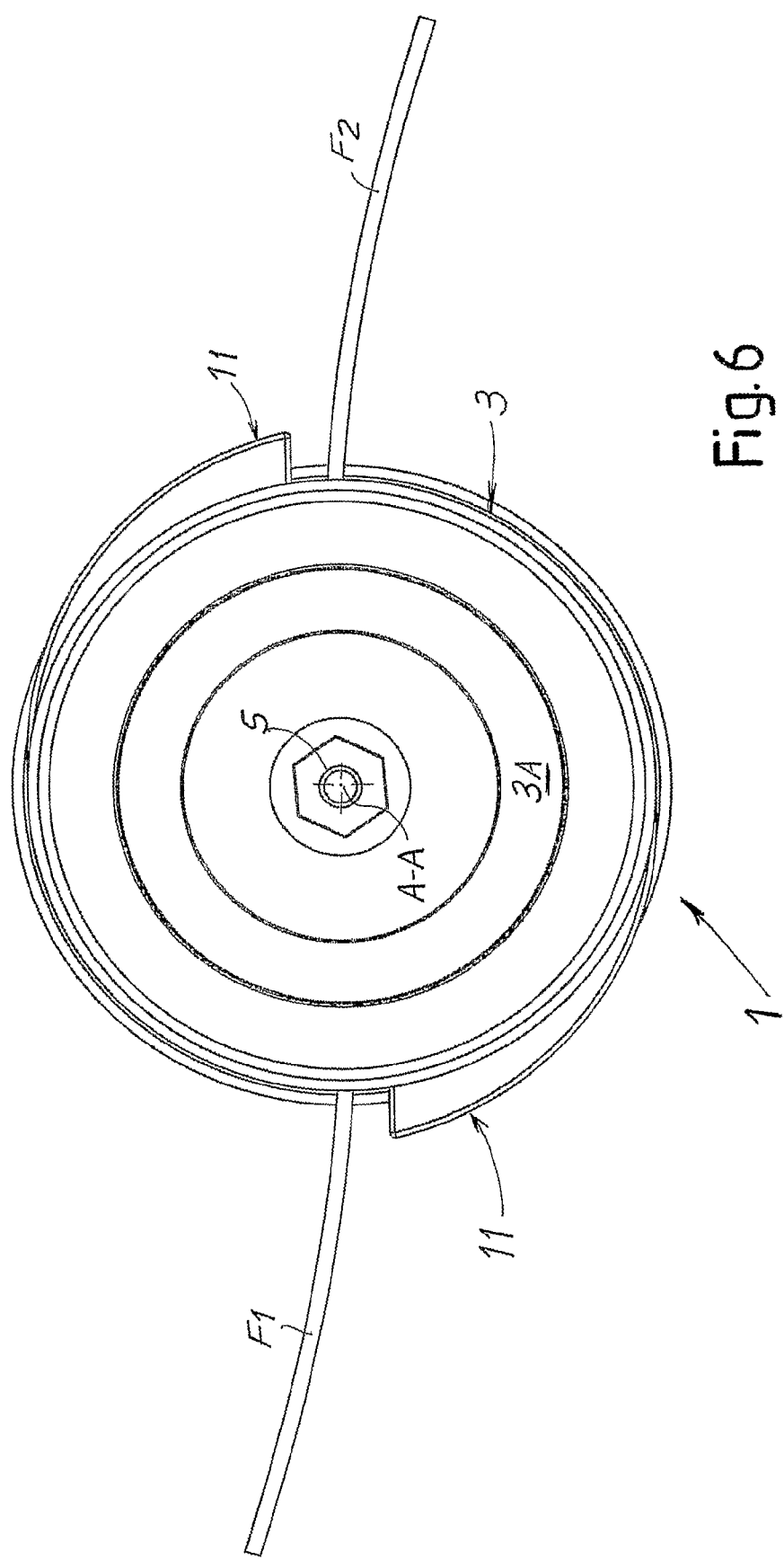
FIG. 6 a plan view according to VI-VI of FIG. 5.

In the embodiment shown in FIG. 4, in which equal numbers indicate equal parts or equivalent parts to that of FIG. 1, a solution is illustrated in which the spiral surface form 11a of projections 11 has a wavy or indented shape, i.e. a toothing indicated by D. This toothing D breaks the obstacles which projections 11 gradually distance from the surface or lateral cylindrical side of mower head 1 during rotation. If these obstacles are represented by vegetation of hardness greater than normal vegetation, toothing D will break down this vegetation in a preliminary way before it knocks against one or other of radial protruding portions F1, F2 of the cutting cord. Even if snapping caused by toothing D is not total, the cutting cord which will knock against this vegetation will find it partially broken and therefore can cut it completely without being submitted to excessive stress and therefore without snapping.

In this case also teethed projections 11 can be manufactured in the base material which forms body 3 of the head, or in different material and possibly be replaced.

FIGS. 5 to 9 show another embodiment of a mower head according to the invention. Identical reference numbers indicate equal parts or parts corresponding to those of the preceding embodiment. Mower head 1, in this case, includes a main body 3 with an essentially cylindrical perimeter wall, on which are inserted bushes 9 with passing holes 9A for cutting cords F1 and F2, made of separate cords, or by different portions of a same cord wound on a spool inside head 1 and not shown. In this case the perimeter projections, still indicated with 11, are not manufactured on the cylindrical surface of body 3 of head 1, but on a ring 12 in metal material, synthetic resin or other suitable material. Ring 12 with projections 11 can also be applied in an extemporary and reversible way on head 1, and more specifically on portion 3A of body 3 of the head.

Figure 7:
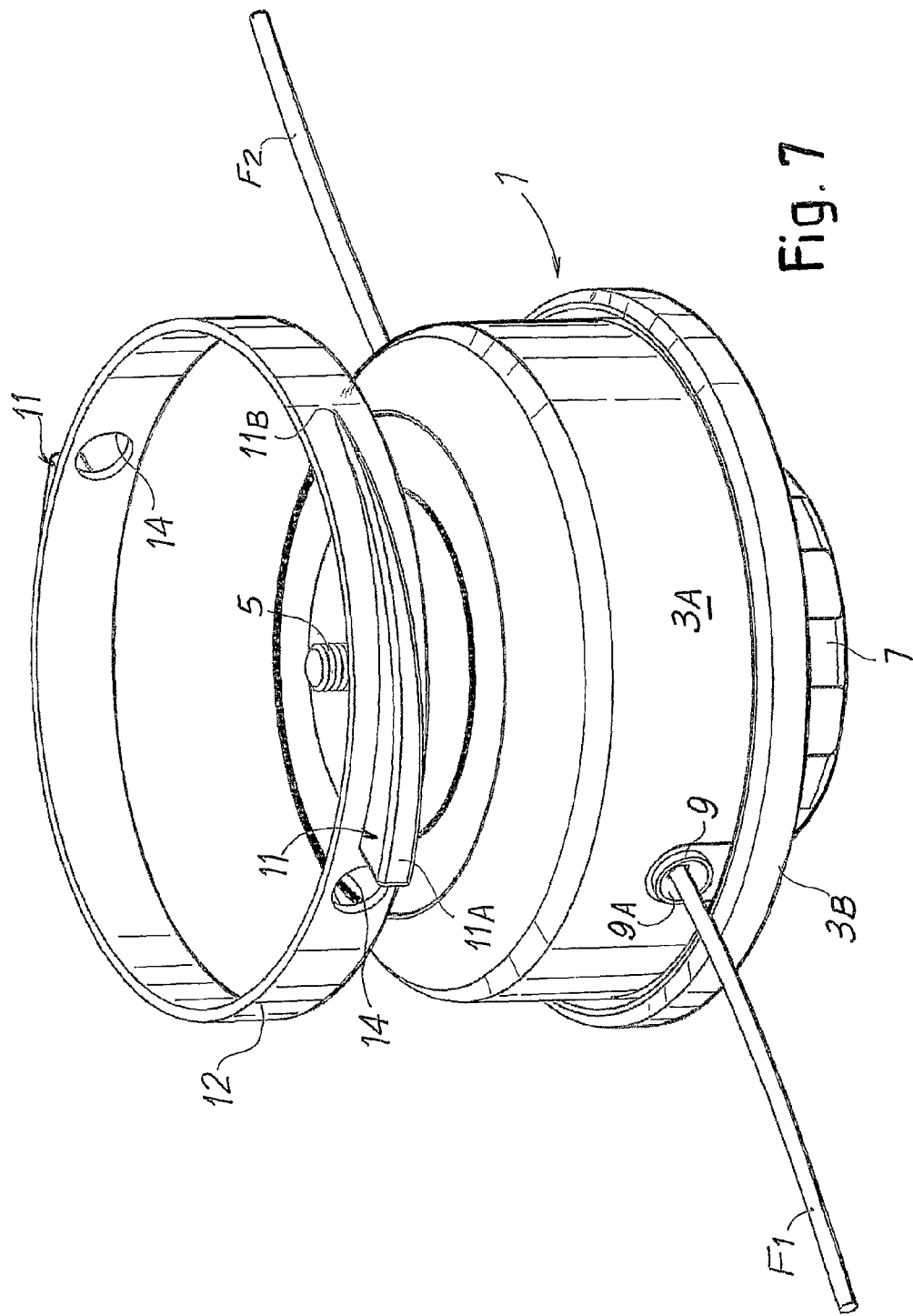
FIG. 7 a perspective view of the mower head of FIG. 5 with the ring detached from the body of the head.

In FIG. 7 ring 12 with projections 11 is shown separate from head 1. It presents, in addition to projections 11, passing holes 14 which (when the ring is mounted on head 1) coincide with bushes 9 and exit holes 9A, to allow cutting cords F1 and F2 to pass.

Figure 8:
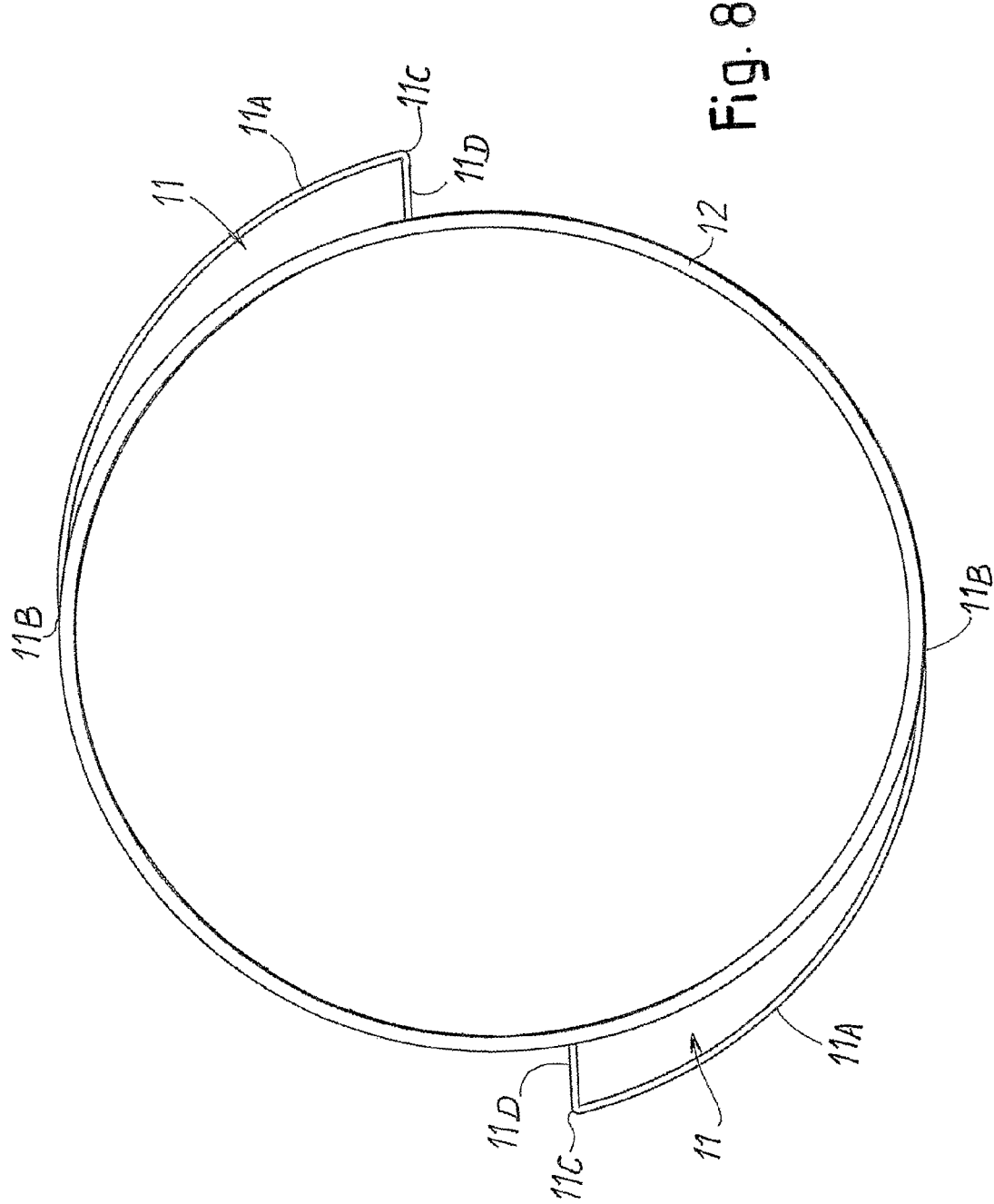
FIG. 8 a plan view of the ring with projections.
Figure 9:
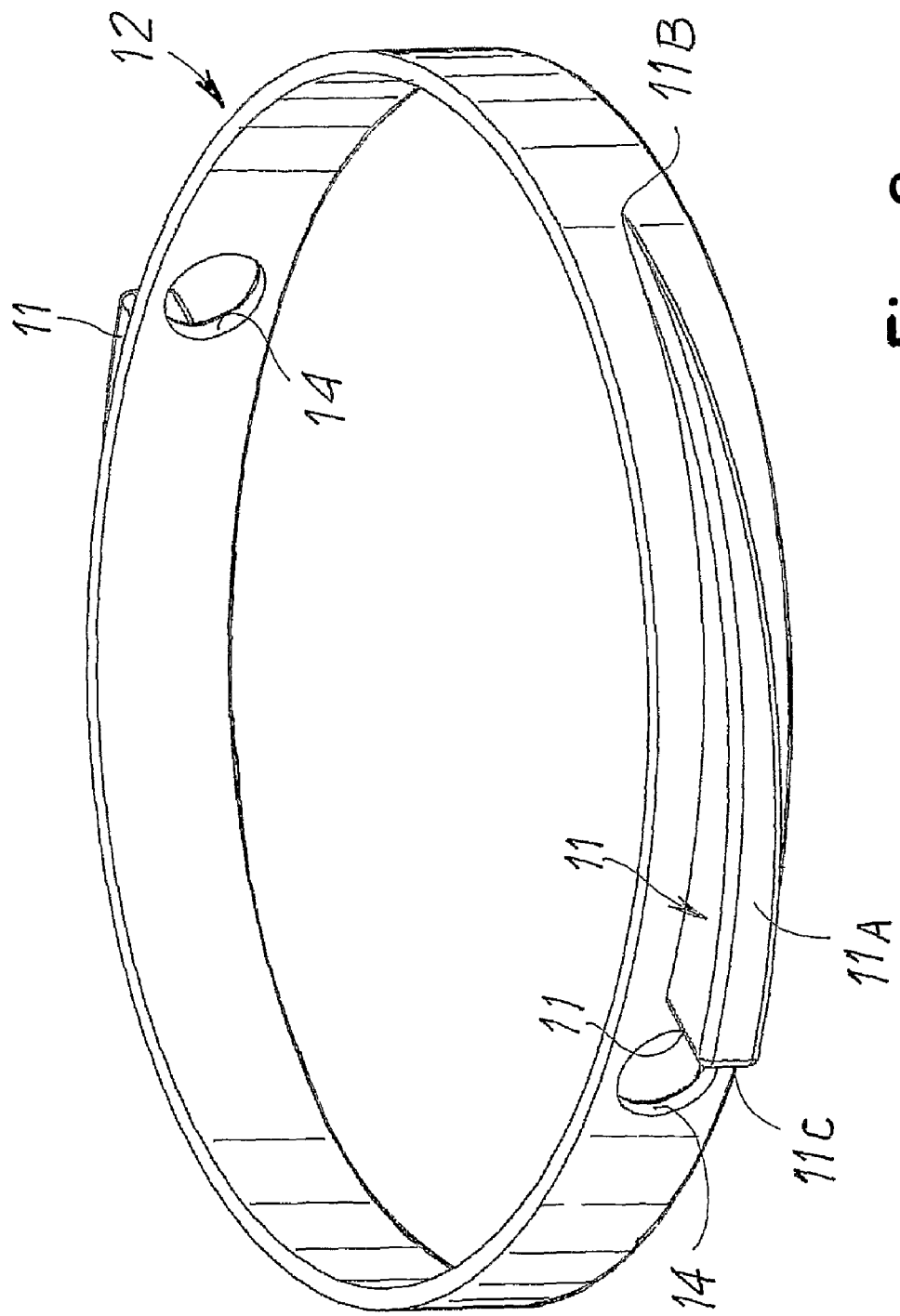
FIG. 9 a perspective view of the ring of FIG. 8.

Ring 12 is shown isolated in a plan view and in a perspective view in FIGS. 8 and 9. It can also be constructed and distributed separately to be mounted on existing and traditional heads to improve and provide them with the functions and advantages described above with reference to FIGS. 1 to 4. The internal diameter of ring 12 can be suitably sized to couple with some interference to the essentially cylindrical surface of portion 3A of body 3 of the head. Otherwise the anchorage can be obtained by means of penetration of bushes 9 in holes 14 of ring 12.

Figure 10:
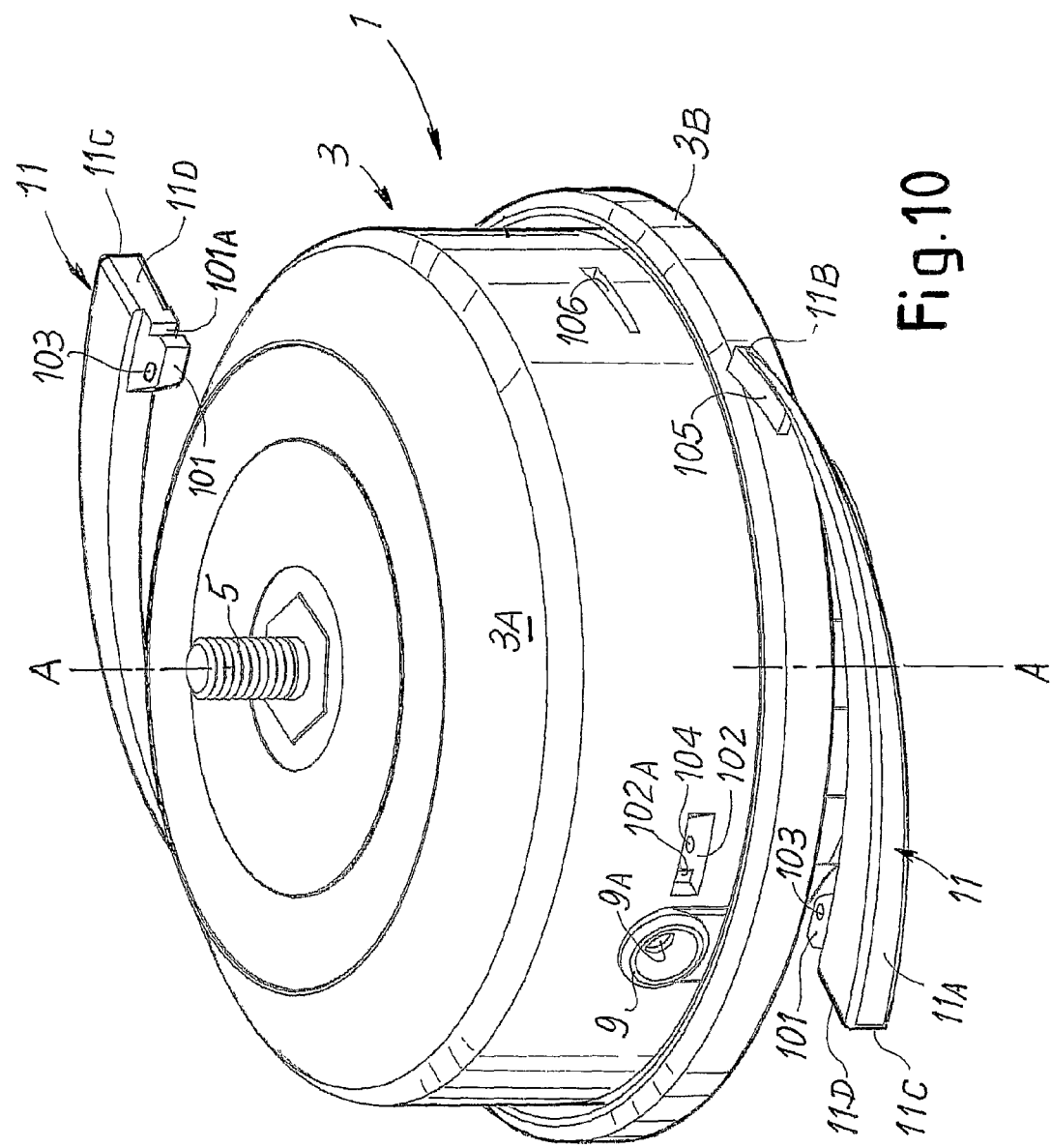
FIG. 10 a plan view of a head according to the invention in a further embodiment.
Figure 11:
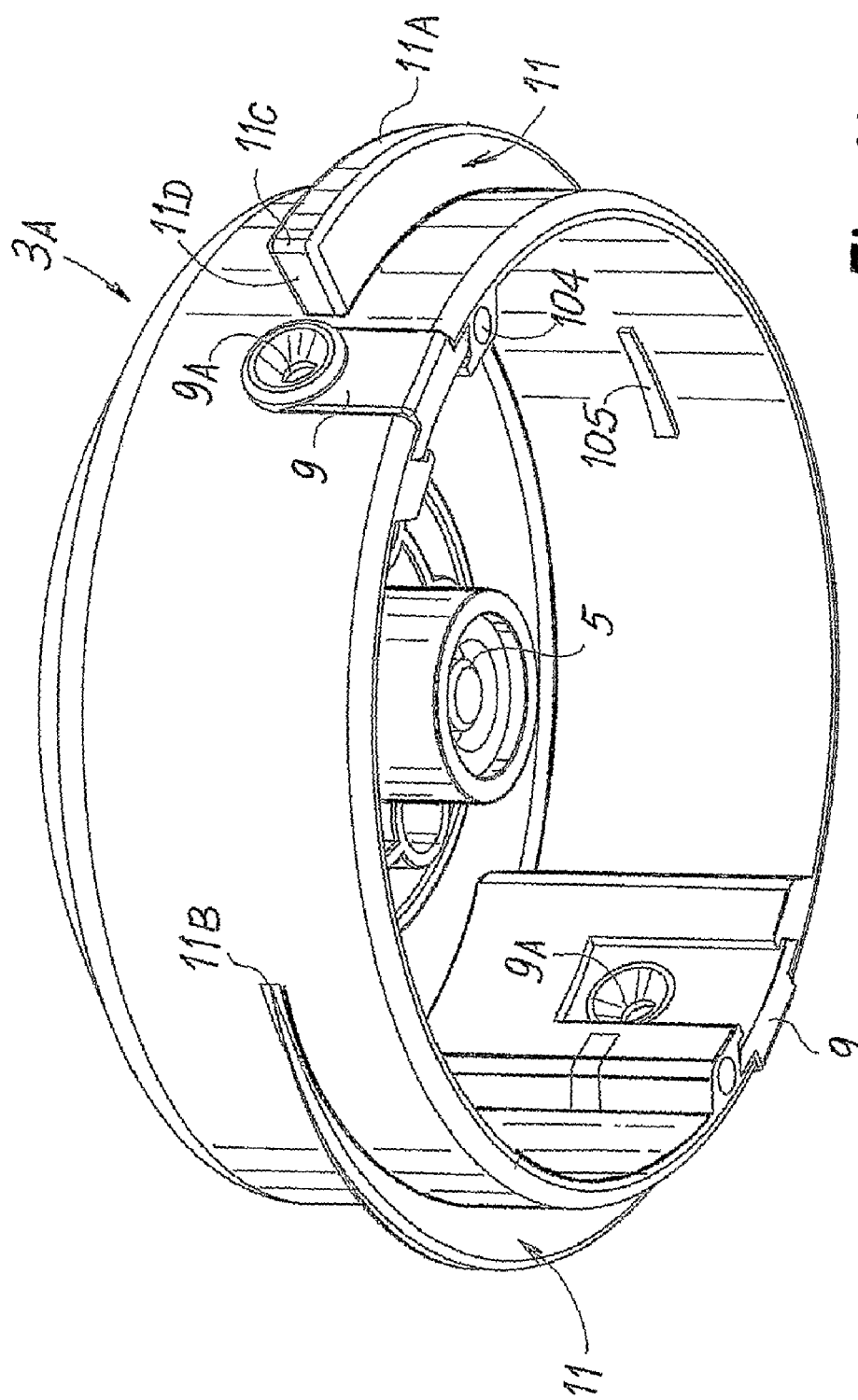
FIG. 11 a perspective view from the bottom of the main part of the body of the head of FIG. 10.

FIGS. 10 and 11 show another embodiment of a head according to the invention. Equal numbers indicate equal parts or equivalent parts to those of the preceding embodiment. In this case projections 11 with their spiral profiles 11A are made as separate and applicable to body 3 of the head, also in a replaceable way if required. To this end each projection 11 has a front tooth 101 adjacent to surface 11D. Tooth 101 has a groove 101A, which is committed in an undercut 102A of a slot 102 in the essentially cylindrical portion 3A of body 3 of head 1. A passing hole 103 in tooth 101 and a passing hole 104, which from the lower edge of the cylindrical side of 3A of body 3 leads to slot 102, allow the blockage of projection 11 by a plug or a pin inserted into said holes 103, 104. At the opposite end, in correspondence of point 11B of projection 11, this presents a relief 105, which inserts itself into a slot 106 formed again in the cylindrical wall of side 3A of body 3.

Figure 12:
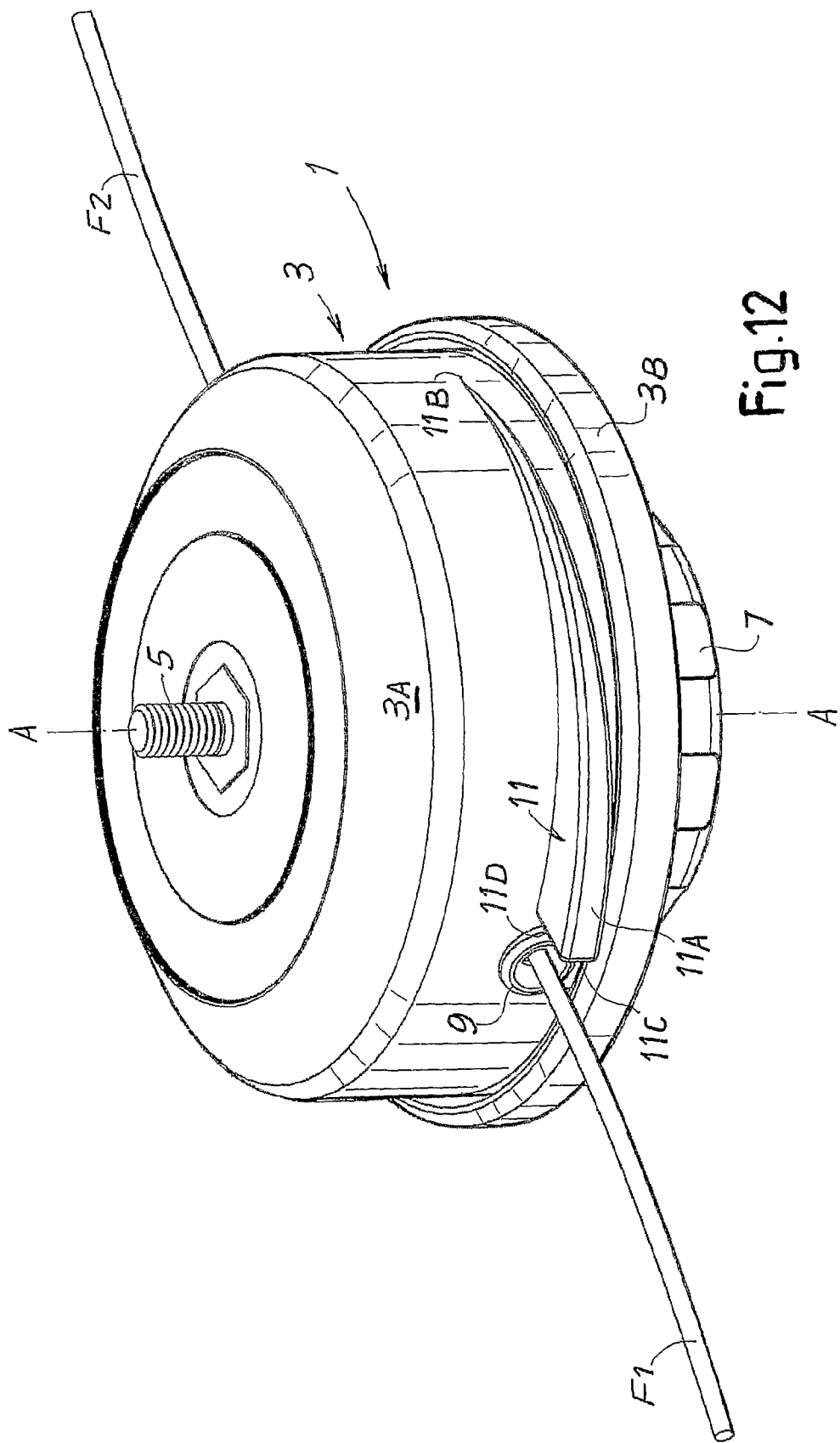
FIG. 12 a perspective drawing of a further embodiment of the invention.

FIG. 12 shows a head equal to the head of FIG. 10 but with projections 11 as part of portion 3A of body 3, of the same or different material to that of the base of body 3.

Figure 13:
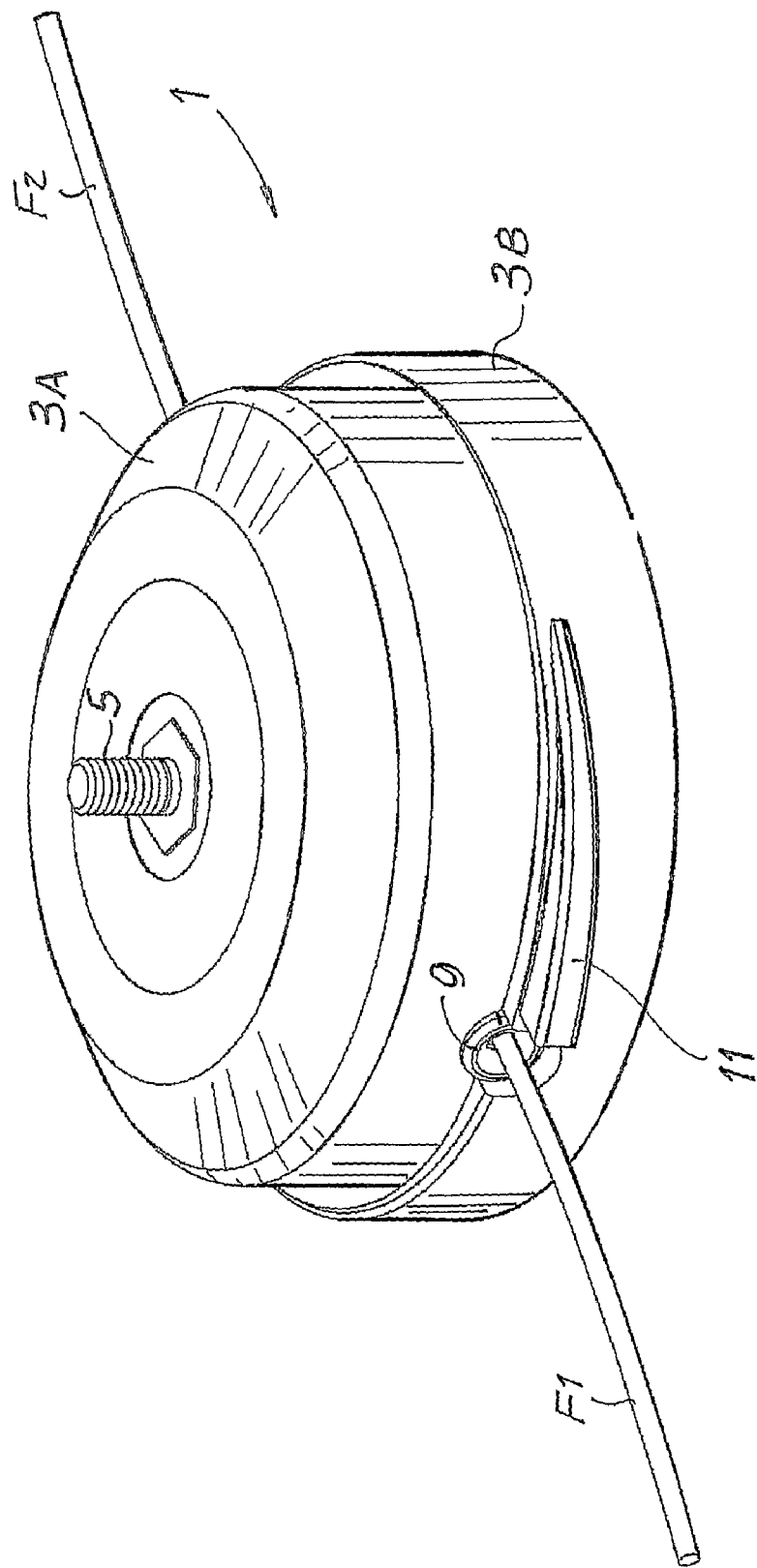

FIGS. 13 and 14 show a further embodiment of the invention. Equal numbers indicate equal parts or equivalent parts to those of the preceding embodiments. Projections 11 in the form of tangential wings to protect the cord are constructed, in this case, as integral parts of lower portion 3B of body 3 of head 1. This lower portion forms the closing lid of the head, which is shown separate from the rest in FIG. 14. Grooves 4 constructed along a cylindrical ring-shaped edge of lid 3B in positions corresponding to bushes 9 through which cords F1 and F2 pass allow assembly without interference with the exit holes of the cutting cords.

It is understood that the drawing shows an example given only as a practical demonstration of the invention, which can vary in the forms and arrangements without getting away from the scope of the concept underlying the invention. Any presence of reference numbers in the claims below is to facilitate reading of the claims with reference to the description and the drawing, and does not limit the scope of protection represented by the claims.

The invention claimed is:

1. A mower head comprising:
a rotation axis and a body with at least one bush having an exit hole, through which an end of a cutting cord exits from said body, said body housing at least one spool for said cutting cord, wherein adjacent to said bush or to each of said bushes from which the cutting cord exits and on at least one side of said bush, a radial projection is provided to protect said cutting cord, said body comprising a substantially cylindrical perimeter wall, said cylindrical perimeter wall defining a cylindrical external surface, said cylindrical external surface being coaxial to said rotation axis, said exit hole being arranged on said cylindrical external surface, said radial projection being arranged on said cylindrical perimeter wall, said radial projection having a first end and a second end, said radial projection having a radial dimension, said radial dimension increasing from said first end to said second end, wherein said radial dimension at said first end of said radial projection is less than said radial dimension at said second end of said radial projection, said second end of said radial projection being located at a spaced location from said at least one bush.

2. Mower head according to claim 1, wherein said radial projection is arranged at the same height of the exit hole.

3. Mower head according to claim 2, wherein said projection or said projections have a tangential wing form.

4. Mower head according to claim 1, wherein said projection or said projections have a tangential wing form.

5. Mower head according to claim 1, wherein said radial dimension at said second end is at least 8 mm.

6. Mower head according to claim 1, wherein a single radial projection is arranged in front of the hole with respect to a rotational direction of the mower head.

7. Mower head according to claim 1, wherein said radial projection has a curvilinear shape which projects gradually from an edge of the body of the head up to a point of maximum projection, adjacent to said hole.

8. Mower head according to claim 7, wherein said radial projection is developed tangentially along the edge of the body of the head, said first end defining a point of the connection to the edge of the body, said second end defining a point of maximum radial projection adjacent to the respective exit hole of the cutting cord.

9. Mower head according to claim 7, wherein said radial projection has a profile which is partly spiral.

10. Mower head according to claim 7, wherein said radial projection terminates close to said hole.

11. Mower head according to claim 1, wherein said head body has two portions coupled to one another, said portions housing said at least one spool, and said at least one bush and the corresponding projection being provided on one of said two portions.

12. Mower head according to claim 1, wherein said radial dimension at said second end is at least 10 mm.

13. Mower head according to claim 1, wherein said radial dimension at said second end is at least 15 mm.

14. Mower head according to claim 1, wherein said first end is located at a first distance from said exit hole, said second end being located at a second distance from said exit hole, said second distance being less than said first distance, said body being rotatable about said rotation axis to define a rotational direction, said radial dimension of said radial projection decreasing from said second end to said first end in said rotational direction.

15. A mower head comprising:
a cutting cord;
a body rotatable about a rotation axis, said body comprising at least one bush having an exit hole, wherein an end of said cutting cord exits from said body via said exit hole, said body comprising at least one spool for said cutting cord, said body defining a maximum external circumference in a plane perpendicular to said rotation axis;
a radial projection for protecting said cutting cord, said radial projection being adjacent to said at least one bush on at least one side of said at least one bush, said body comprising a substantially cylindrical perimeter wall, said cylindrical perimeter wall defining a cylindrical external surface, said cylindrical external surface being coaxial to said rotation axis, said exit hole being arranged on said cylindrical external surface, said radial projection being arranged on said cylindrical perimeter wall, said radial projection having a first end and a second end, said radial projection having a radial dimension, said radial dimension increasing from said first end to said second end, wherein said radial dimension at said first end of said radial projection is less than said radial dimension at said second end of said radial projection, said second end of said radial projection being located at a spaced location from said at least one bush, said second end of said radial projection being radially external to said maximum circumference.

16. A mower head comprising:
a cutting cord;
a body rotatable about a rotation axis, said body comprising an outer circumferential surface and at least one bush having an exit hole, wherein an end of said cutting cord exits from said body via said exit hole, said body comprising at least one spool for said cutting cord;
a radial projection for protecting said cutting cord, said radial projection being adjacent to said at least one bush on at least one side of said at least one bush, said outer circumferential surface extending about said rotation axis, at least a portion of said at least one bush being arranged on said outer circumferential surface, wherein said exit hole is adjacent to said outer circumferential surface, said radial projection engaging said outer circumferential surface, said radial projection extending along a portion of said outer circumferential surface, said radial projection having a first end and a second end, said radial projection having a radial dimension, said radial dimension continuously increasing from said first end to said second end, wherein said radial dimension at said first end of said radial projection is less than said radial dimension at said second end of said radial projection, said radial projection having a radial projection second end surface, said radial projection second end surface extending in a direction parallel to said rotation axis, said radial projection second end surface being located at a spaced location from said at least one bush, said second end of said radial projection being radially external to said outer circumferential surface.

17. Mower head in accordance with claim 16, wherein said radial projection second end surface is substantially perpendicular to said outer circumferential surface.

18. Mower head according to claim 17, wherein said first end is located at a first distance from said exit hole, said second end being located at a second distance from said exit hole, said second distance being less than said first distance, said body being rotatable about said rotation axis to define a rotational direction, said radial dimension of said at least one radial projection decreasing from said second end to said first end in said rotational direction.

* * * * *